United States Patent [19]

Stobb

[11] Patent Number: 4,519,740
[45] Date of Patent: May 28, 1985

[54] APPARATUS AND METHOD FOR PALLETIZING BUNDLES OF SHEETS

[75] Inventor: Walter J. Stobb, Pittstown, N.J.

[73] Assignee: Stobb, Inc., Clinton, N.J.

[21] Appl. No.: 505,455

[22] Filed: Jun. 17, 1983

[51] Int. Cl.³ .............................................. B65G 57/03
[52] U.S. Cl. ...................................... 414/71; 198/479; 198/486; 414/78; 414/786
[58] Field of Search .................... 414/71, 77, 78, 79, 414/786; 198/479, 486

[56] References Cited

U.S. PATENT DOCUMENTS

| | | | |
|---|---|---|---|
| 2,919,821 | 1/1960 | Young | 414/79 X |
| 3,612,300 | 10/1971 | Berghgracht | 414/101 X |
| 3,757,966 | 9/1973 | Cox et al. | 414/71 X |
| 3,901,392 | 8/1964 | Streckert | 414/71 |
| 3,912,070 | 10/1975 | Cronk et al. | 414/79 X |
| 3,934,736 | 1/1976 | Thomas | 414/79 X |
| 4,083,461 | 4/1978 | Wangermann | 414/71 |
| 4,303,365 | 12/1981 | Euverard et al. | 414/78 X |
| 4,419,035 | 12/1983 | Stobb | 414/71 |

FOREIGN PATENT DOCUMENTS

| | | |
|---|---|---|
| 18354 | 11/1957 | Fed. Rep. of Germany . |
| 2213120 | 3/1972 | Fed. Rep. of Germany ........ 414/71 |
| 2721675 | 5/1977 | Fed. Rep. of Germany ........ 414/70 |

Primary Examiner—Leslie J. Paperner
Attorney, Agent, or Firm—Arthur J. Hansmann

[57] ABSTRACT

Apparatus and method for palletizing bundles of sheets to move them from a first position or pickup station and into rows and stacks on a pallet on a second or deposit station. A single overhead and endless conveyor is utilized. A bundle pickup mechanism, such as a clamp, is employed to the conveyor and has elevator means for lifting the bundle relative to the overhead crane or conveyor and for then lowering the bundle at the deposit station and relative to the overhead crane or conveyor. In that manner, the apparatus is simplified in utilizing one endless overhead crane or conveyor, and the entire system is automated by means of electric sensors and powered mechanisms.

13 Claims, 3 Drawing Figures

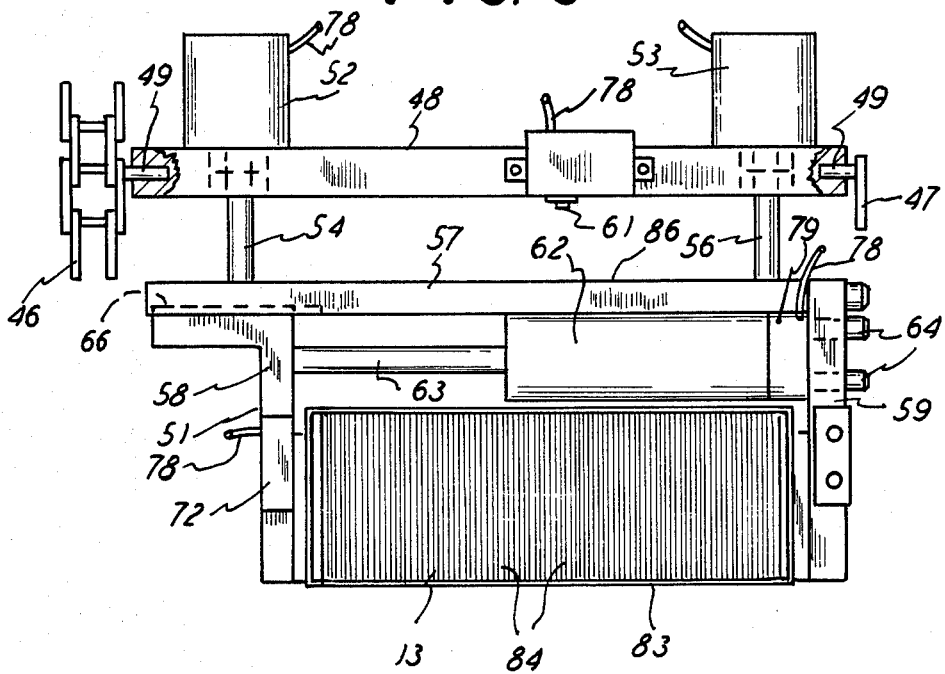

APPARATUS AND METHOD FOR PALLETIZING BUNDLES OF SHEETS

This invention relates to apparatus and method for palletizing bundles of sheets such as moving single bundles of sheets from a pickup station and into rows stacked on a pallet, and doing so automatically.

BACKGROUND OF THE INVENTION

The prior art is already aware of palletizing items which are in a block form, such as a bundle of sheets, and the common way of accomplishing this is to manually stack the bundles of sheets in layers and rows on a pallet. In a broader sense, the prior art also is aware of utilizing pickup devices and overhead cranes for handling box-like items which can be stacked onto pallets. The present invention involves use of a pickup mechanism for a bundle of sheets and having that mechanism attached to an overhead crane which transports the bundle of sheets to a specific location on a pallet underneath the overhead crane, such that a single pickup station is utilized but the various bundles are placed in respective positions on the pallet to form layers and rows of the bundles on the pallet.

Palletizing or other movement of bundles or the like is shown in U.S. Pat. Nos. 3,612,300 and 3,757,966 and 3,901,392 and 4,083,461 and West German Pat. No. 18,354 and West German Pat. No. 2,213,120 and West German Pat. No. 2,721,675; also see U.S. Pat. No. 4,419,035.

The present invention improves upon and differs from the prior art in that it provides for a simplified overhead crane type of structure which picks up a bundle of sheets at a first position and moves the bundle of sheets directly to a palletizer where the sheets are placed in layers and stacks in respective positions. In accomplishing this, the overhead conveyor or crane is of an endless conveyor construction where the conveyor continuously moves around support members, such as pulleys, and in given directions so that the conveyor can be operated with a simplified drive mechanism which accomplishes the uni-directional drive to the endless conveyor. Therefore, the endless conveyor picks up the bundle of sheets and elevates them and then moves them horizontally to the position on the pallet, and the conveyor then continues in its previous direction to ultimately reverse its direction and return to the pickup station for the next bundle.

Further, the present invention differs from the prior art in that it provides for electric means which initially position the pickup mechanism at the pickup station and which then elevates the gripped bundle and moves it horizontally to a position relative to the pallet where the bundle is lowered by an elevator means independent of the overhead crane itself. In that regard, the overhead crane is of a simplified construction and is continuously driven in its one endless manner, as mentioned, and only the elevator means is operated for lowering and depositing the bundle on the pallet.

In further distinction over the prior art, the present invention provides for operating an electric pickup means at the pickup station for initially elevating the bundle, and then utilizing the photo-electric cell for controlling the height of the pallet and utilizing another photo-electric cell for positioning the elevated bundle relative to the pallet, and then finally operating an elevator means which lowers the bundle onto the pallet and does so independent of the operation of the overhead crane itself. In this regard, only one overhead crane drive is required since the crane moves in its continuous and endless manner, such as mentioned.

BRIEF DESCRIPTION OF THE DRAWINGS

FIG. 3 is an enlarged end elevational view of some of the embodiment of FIG. 1.

DETAILED DESCRIPTION OF THE PREFERRED APPARATUS AND METHOD

Figure 1:
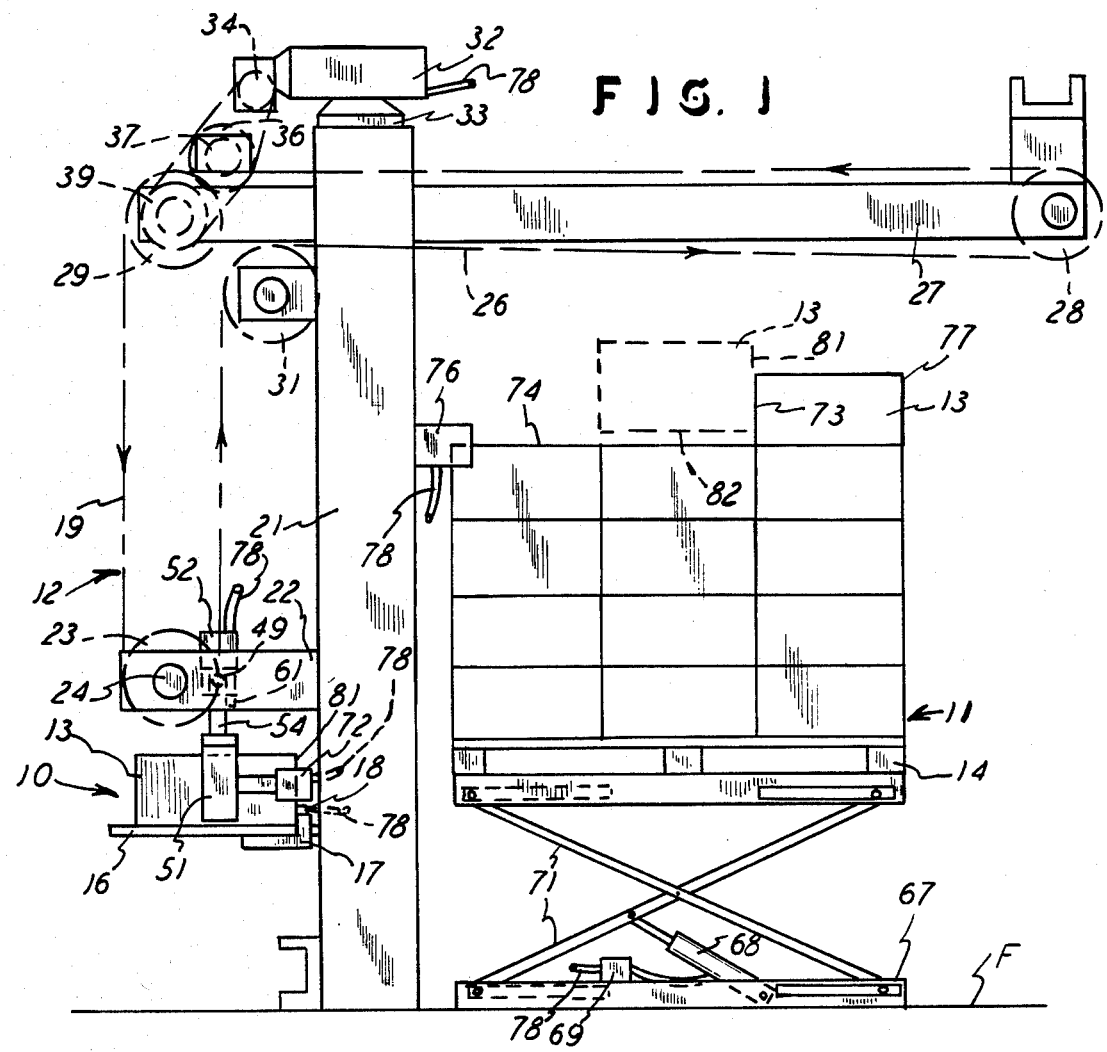
FIG. 1 is a side elevational view of an embodiment of this invention.

In the following description of the apparatus, with reference to the accompanying drawings, the method of this invention will also be described and understood by anyone skilled in the art. FIG. 1 shows a first position or pickup station generally designated 10 and a second position or deposit station generally designated 11. An endless overhead conveyor, generally designated 12, extends between the two positions for transporting the bundles of sheets, such as the bundle 13, from position 10 to position 11 where a pallet 14 is located. The apparatus and method are an improvement upon the prior art in that they are highly simplified and yet operate accurately and efficiently in the pickup and deposit of the bundles of sheets, into contact.

The station 10 can include an ordinary and conventional type of bundle mover 16, which could be a conveyor belt, moving the bundle of sheets 13 from left to right, as viewed in FIG. 1 and against a stop 17 and an electric switch 18. That position is directly beneath a vertical section 19 of the endless conveyor or overhead crane 12. Two spaced-apart columns 21, provide an upright support for the apparatus shown, including the mounting of the stop 17 and the mounting of a support 22 for a pulley 23 on a shaft 24 of the crane 12. As shown, the crane 12 is in dot-dash lines, and it can be of a chain and sprocket system of a conventional arrangement, and it moves in the direction of the arrows shown thereon through the vertical section 19 and the horizontal section 26. The sections 19 and 26 form a right angle in the profile of FIG. 1, and section 19 is the only vertical section of the crane 12, and horizontal section 26 is the only portion of the crane 12 that exists laterally of the one vertical section 19. It will also be noticed that a horizontal support 27 is suitably mounted on each standard 21, and the ends of each support 27 carry pulleys 28 and 29. A pulley 31 is also mounted on each standard 21. With that arrangement, the drawings show that there are two runs of the conveyor 12 and that they are horizontally spaced apart and are movable on the four pulleys on each side, as described.

Figure 2:
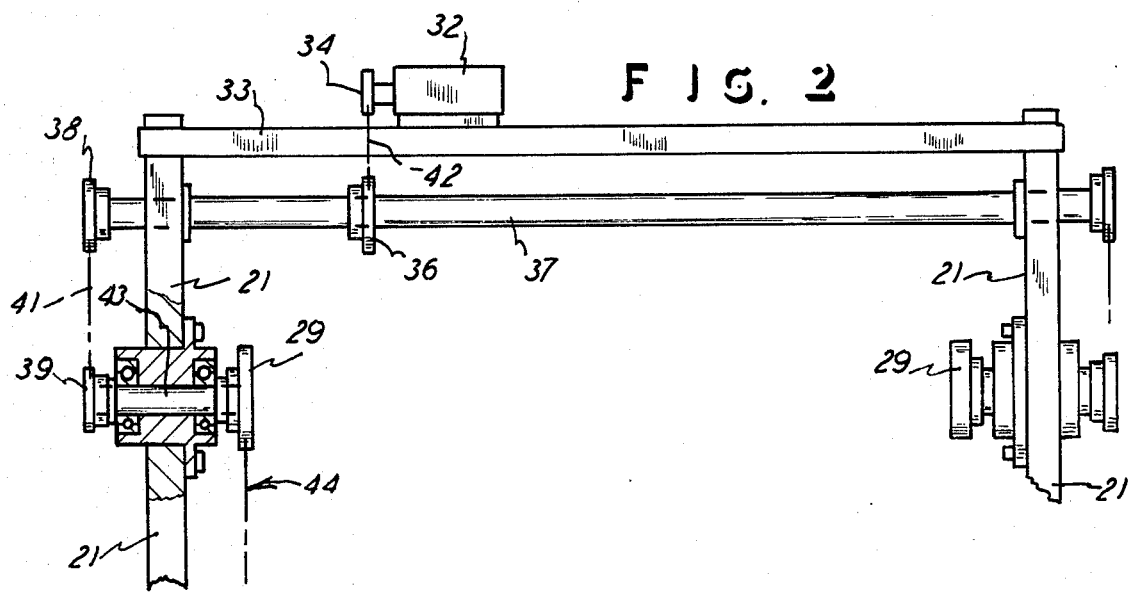
FIG. 2 is an end elevational view, partly in section, of some of the embodiment of FIG. 1.

FIGS. 1 and 2 further show an electric motor 32 mounted on a cross-member 33 supported on the standards 21, and the motor has a sprocket 34 which drives a sprocket 36 on a jack shaft 37 rotatably mounted and extending between the standards 21, as seen in FIG. 2. In turn, a sprocket 38 is on each end of the jack shaft 37 and a sprocket 39 is driven thereby through a chain 41, such as the chain 42 driving between the sprockets 34 and 36. A shaft 43, rotatably supported on each standard 21, carries the respective sprocket 31 which in turn carries the overhead crane endless belt or chain member, generally designated 44 and consisting of the sections 19 and 26. In that manner, operation of the motor 32 will rotate the shaft 37 and in turn drive the sprocket 39 and the sprocket 29 and thus displace the endless conveyor 44 in the direction of the arrows shown thereon in FIG. 1.

FIGS. 2 and 3 show the horizontally spaced-apart extents of the endless conveyor 12, and the specifics of chains 46 and 47 are thus shown. A support beam 48 is shown engaged at its opposite ends with the respective chains 46 and 47 through pins 49. Thus the beam 48 is displaced along with the movement of the endless conveyor 12, and it carries the bundle 13 supported in a bundle clamp 51 suspended from the beam 48. Two electrically operated elevator or lift means 52 and 53 are mounted on the beam 48 and have vertically movable rods 54 and 56 extending therebelow and being suitably connected with a bar 57 which in turn is suitably connected with the abutment members 58 and 59 of the clamp 51. Thus, by any suitable power, such as fluid or electric, the means 52 and 53 are cylinder means having extendable rods 54 and 56 for raising and lowering the clamp 51 independent of the vertical movement of the conveyor 12. An electric switch 61 on the beam 48 is exposed to the clamp 51 such that upon raising the clamp 51 by the elevator means 52 and 53, the switch 61 is tripped to electrically discontinue the operation of the means 52 and 53.

The clamp 51 has its abutments 58 and 59 both preferably movable toward and away from each other by means of a cylinder 62 with a rod 63, connected and disposed as indicated. Thus, the abutments 58 and 59 both move toward and away from the respective ends of the bundle of sheets 13, and that type of cylinder 62 is conventional and is shown to provide for the movement of the abutment 58 on slide pins 64, for instance, and the abutment 58 can slide in a track 66 on the member 57.

FIG. 1 shows the floor F on which is mounted a conventional type of scissors table 67 which supports the pallet 14 and moves it up and down, as desired. A powered cylinder 68 under the influence of a fluid or other power supply 69, is attached to the legs 71 of the scissors table 67 for raising and lowering the upper ends of the legs 71 in the raising and lowering of the pallet 14, all in a conventional manner.

In the sequence of operation, the clamp 51 is placed into the pickup or ready position shown in FIG. 1, and it is actuated into the clamping position on the bundle 13 and the elevator means 52 and 53 can then be actuated to initially lift the bundle 13 off its conveyor or support 16, and that actuation can be either manual or automatic by means of the electric switch 18 activated by the abutment from the bundle 13. Next, the switch 61 is engaged by the rising clamp 51, and the elevator means is then stopped. Next, the crane motor 32 is engaged, such as by means of the actuation of switch 61, and that moves the overhead crane to where the bundle 13 is placed in a position above the pallet 14, and, in the arrangement shown in FIG. 1, that position would be the dotted position shown for the bundle 13. That dotted position was achieved by means of a photo cell or laser beam or the like 72 attached to the clamp 51 and extending offset therefrom to align with the edge 73 of the previously positioned bundle 13 on the pallet 14, as shown. The electric element is connected with the motor 33 to thereby stop the motor 33 and thus stop the endless conveyor 12 so that the bundle 13 is in the dotted position described. Next, the element 72 actuates the elevator means 52 and 53 to lower the dotted bundle 13 into its position adjacent the edge 73. Next, the clamp cylinder 62 is sequenced by means of the sensor 72 and is thus opened so that the bundle 13 is released, and also the elevator means 52 and 53 are sequenced to again raise the clamp 51 against the electric switch 61 and thereby clear the deposited bundle 13 and permit the clamp 51 to move toward the pulley 28 and therepast and back to the pulley 29 and around the pulley 23 and back to the readied position shown in FIG. 1. The next sequence then is to lower the clamp 51 and to close the clamp 51, such as by the electric connections with the switch 18, as mentioned, and the sequence is then repeated for the next bundle of sheets.

FIG. 1 also shows that the pallet 14 is raised to where there will always be an upper level designated 74 which is the level within the reach of the stroke of the elevator means 52 and 53 so that the crane 12 need not elevate at its position above the pallet 14. That is accomplished by a laser or photo cell 76 mounted on the column 21 to actuate the power means 69 and thereby actuate the scissors table 67 for lowering the pallet 14 for each layer of the bundle of sheets. When there is one full layer of bundles 13 on the pallet 14, the sensor or photo cell 72 will detect the edge 77 of that full layer and thus deposit the next bundle in line with that edge 77, just as it detected the edge 73 and thus interrupted the operation of the motor 32 for the accurate horizontal positioning of the new bundle 13. The electrical interconnection of the various sensors 18, 61, and 76, along with the motor 32 and the elevator means 52 and 53, and the powered electric means 69 and is a conventional arrangement and will be understood by anyone skilled in the art. The motor 32 is of the brake motor design so that it stops in the accurate horizontal position above the pallet 14 for accurately positioning the new bundle 13.

Electric wire 78 is shown connected to each of the several electric elements described, and of course it will be understood that the wires have sufficient length and flexibility to permit the movements and actions described herein. It is also shown that the cylinder unit 62 includes an electric element 79 having a wire 78 connected therewith for automatic extension and retraction of the cylinder 62 in the appropriate sequence described for the release and clamping of each bundle 13.

The abutments 58 and 59 of the lift means or clamp 51 are on the longitudinal ends of the bundle 13, and are of a width narrower than the bundle 13, such as shown in FIG. 1. The photo cell or element 72 is disposed to be operative on and aligned with the bundle edge 81, or otherwise be related thereto, so that the edge 81 will be positioned in contact with the side or edge 73, as shown in FIG. 1. That is, the bundle 13 is held by the lift member 51 to have the bundle side 81 and the bottom 82 completely clear and free for positioning in full contact with the adjacent bundle side 73 and the bundle top 74, respectively. Thus, the bundles 13 are placed in the tight contacting positions shown in FIG. 1. Of course it will be understood that each bundle 13 has been bound or strapped, in the conventional manner, by the time it reaches the stop 17, and that will be as shown by the strap 83 extending only longitudinally of the bundle, but completely therearound, as shown in FIG. 3. The bundle sheets 84 are thus bound by the strap 83, and therefore the tight stacking shown and described can be accomplished. Also, the pickup station at 10, and the deposit station at 11 form a straight line which is in the same vertical plane as that of the endless conveyor 12, and therefore the single drive 32 can be utilized for the entire operation. It will also be understood by anyone skilled in the art that the required and usual photo cell components for emitting the signal to activate the shown photo cells would be employed in appropriate positions such as upwardly along the side 77, to be first sensed by the photo cell 72, and horizontally along the side 73, to be next sensed by the photo cell 72; likewise, the emitter would be operative horizontally along the top 74 for the photo cell 76, and anyon skilled in the art will already understand those arrangements.

The stroke of the elevator means 52 and 53 need be only several inches, and, on the upstroke, the switch 61 is manually depressed by the upper surface 86 of the beam 57 to activate the electric switch 61 and thus interrupt the upward movement of the lift members 52 and 53 when the clamp 51 is released from the bundle 13 and is ready to return to the pickup station 10. Sequentially, the switch 61 is arranged to extend the rods 54 and 56 to the extended or lowered positions shown in FIG. 3 for engaging the bundle 13 at the pickup station 10 and for the electric sequencing of the electric element 79 to close the abutments 58 and 59 onto the ends of the bundle 13 and thus clamp the bundle for the next movement to the stacking position on the pallet 14, all as described.

Thus, the clamp 51 is of a width narrower than that of the bundle 13 and the bundles can be of any common width, and they will still be stacked in side-by-side contact with each other, because of the sensor 72 detecting edges 73 and 77.

What is claimed is:

1. Apparatus for palletizing bundles of sheets, comprising a pallet, a gripper for engaging a bundle of sheets, an overhead endless conveyor on which said gripper is mounted and including a vertical section for elevating said bundle of sheets from a first position and including a horizontal section for moving said bundle of sheets to a second position vertically above said pallet, said conveyor sections being continuous relative to each other for movement between said first position and said second position, an electric drive operatively connected with said overhead endless conveyor for powering said overhead endless conveyor, electric elements at said first position and at said second position and being electrically interconnected with said electric drive for controlling the operation of said electric drive in the movement of said bundle of sheets, said gripper includes a powered elevator for lowering said bundle of sheets at said second position and independent of the movement by said endless conveyor, and an additional electric element operatively connected with said elevator for powering said elevator at said first position to raise said bundle of sheets prior to the raising by said conveyor.

2. The apparatus for palletizing bundles of sheets, as claimed in claim 1, wherein said endless conveyor includes two movably supported and spaced apart endless lines, and said gripper is articularly connected to said lines and disposed therebetween.

3. The apparatus for palletizing bundles of sheets, as claimed in claim 2, including rotatably mounted supports on which said lines are trained for movement therepast.

4. The apparatus for palletizing bundles of sheets, as claimed in claim 3, wherein said lines on said supports form a right angle shape in the side elevational view thereof.

5. The apparatus for palletizing bundles of sheets, as claimed in claim 3, wherein said lines are two independent and parallel chains, and said rotatably mounted supports are sprockets.

6. The apparatus for palletizing bundles of sheets, as claimed in claim 1, wherein said electric elements include a photocell for positioning said bundle of sheets on said pallet.

7. The apparatus for palletizing bundles of sheets, as claimed in claim 2, wherein said gripper includes a powered elevator for lowering said bundles of sheets at said second position and independent of the movement by said endless conveyor.

8. The apparatus for palletizing bundles of sheets, as claimed in claim 2, wherein said electric elements include a photocell for positioning said bundle of sheets on said pallet.

9. Apparatus for palletizing bundles of sheets from a first position and into a second position adjacent said first position, comprising a pallet disposed at said second position, an overhead endless conveyor including means for engaging a bundle of sheets and including a vertical section for elevating said bundle of sheets from the first position and to an elevation directly above said first position and said conveyor including a horizontal section extending at said elevation and only to one side of said vertical section and directly vertically over said second position for moving said bundle of sheets to the second position and vertically above said pallet, said conveyor sections being at right angles and continuous relative to each other for movement between said first position and said second position, an electric drive operatively connected with said overhead endless conveyor for powering said overhead endless conveyor, electric elements adjacent said first position and adjacent said second position and being electrically interconnected with said electric drive for controlling the operation of said electric drive in the movement of said bundle of sheets, a vertically powered elevator mounted on said endless conveyor and interposed between said endless conveyor and the first said means engaging said bundle of sheets for vertically moving said bundle of sheets independent of said endless conveyor and at both said first position and said second position, and power controls connected with said powered elevator for vertically moving said powered elevator.

10. A method of stacking bundles of sheets from a pickup station and onto a pallet and with an overhead crane system, comprising the steps of locating a pallet on a floor, photoelectrically sensing the presence of a bundle of sheets at said pickup station, gripping the first one of a bundle of sheets at said pickup station and with a powered clamp which includes an elevator means actuated by said photo-electric sensing and lifting the clamped bundle of sheets and said clamp, first with said elevator means and next with a crane carrying said elevator means, into an overhead position, moving the bundle of sheets horizontally by means of said crane to a position directly above said pallet, actuating said elevator means by an additional photoelectrically sensing means and lowering the bundle of sheets onto said pallet, releasing the bundle of sheets and moving said powered clamp back to said pickup station, gripping a second bundle of sheets at said pickup station and lifting and moving said second bundle of sheets with said elevator means and said crane to a position directly above said pallet, electrically sensing the location of said first bundle of sheets on said pallet, moving said second bundle of sheets and said powered clamp in response to said electric sensing, and positioning said second bundle of sheets onto said pallet and adjacent said first bundle of sheets.

11. The method of stacking bundles of sheets from a pickup station and onto a pallet and with an overhead crane system, as claimed in claim 10, including the step of lowering said pallet the height of the bundles after one layer of the bundles exists on said pallet in side-by-side position.

12. The method of stacking bundles of sheets from a pickup station and onto a pallet and with an overhead crane system, as claimed in claim 10, including the step of gripping each bundle of sheets only at their opposite ends and leave the opposite sides clear.

13. The method of stacking bundles of sheets from a pickup station and onto a pallet and with an overhead crane system, as claimed in claim 10, including the step of photoelectrically sensing the positions of the bundles on said pallet for guidance of said powered clamp.

* * * * *